United States Patent
Sorensen et al.

(10) Patent No.: US 9,932,492 B2
(45) Date of Patent: Apr. 3, 2018

(54) ALKYD RESIN COMPOSITION COMPRISING SILICA

(71) Applicants: Perstorp AB, Perstorp (SE); Dyrup A/S, Soborg (DK)

(72) Inventors: Kent Sorensen, Perstorp (SE); David Lof, Vellinge (SE)

(73) Assignees: PERSTORP AB, Perstorp (SE); DYRUP A/S, Soborg (DK)

( * ) Notice: Subject to any disclaimer, the term of this patent is extended or adjusted under 35 U.S.C. 154(b) by 607 days.

(21) Appl. No.: 14/369,155

(22) PCT Filed: Dec. 20, 2012

(86) PCT No.: PCT/SE2012/000209
§ 371 (c)(1),
(2) Date: Jun. 26, 2014

(87) PCT Pub. No.: WO2013/100836
PCT Pub. Date: Jul. 4, 2013

(65) Prior Publication Data
US 2014/0360408 A1    Dec. 11, 2014

Related U.S. Application Data

(60) Provisional application No. 61/581,407, filed on Dec. 29, 2011.

(51) Int. Cl.
*C09D 167/08* (2006.01)
*C08K 3/10* (2018.01)
*C08K 3/36* (2006.01)

(52) U.S. Cl.
CPC ............. *C09D 167/08* (2013.01); *C08K 3/10* (2013.01); *C08K 3/36* (2013.01); *C08K 2201/011* (2013.01)

(58) Field of Classification Search
CPC ........... C09D 167/08; C08K 3/10; C08K 3/36
See application file for complete search history.

(56) References Cited

U.S. PATENT DOCUMENTS

| | | | | |
|---|---|---|---|---|
| 6,015,855 A | * | 1/2000 | Dalton ..................... | C08K 3/34 523/443 |
| 2004/0147029 A1 | * | 7/2004 | Adam ...................... | C08K 3/36 436/8 |
| 2005/0256262 A1 | * | 11/2005 | Hill ....................... | C09D 7/1291 524/702 |
| 2010/0178519 A1 | * | 7/2010 | Heiberger ............... | B05D 7/08 428/447 |
| 2011/0207850 A1 | * | 8/2011 | Kan ........................ | C08J 3/03 523/402 |

FOREIGN PATENT DOCUMENTS

| | | | | | |
|---|---|---|---|---|---|
| WO | WO 2010103020 A1 | * | 9/2010 | ............. | B82Y 30/00 |
| WO | WO 2012130763 A1 | * | 10/2012 | ............. | C09D 5/028 |

* cited by examiner

*Primary Examiner* — Jun Li
(74) *Attorney, Agent, or Firm* — Polsinelli PC

(57) ABSTRACT

Disclosed is an oxidatively drying alkyd resin composition and a method for preparing said composition. Said composition is obtained by admixing an aqueous silica sol into a substantially 100% alkyd resin being in a liquid state either at ambient temperature or at an elevated temperature. Said silica sol is added in an amount of 0.1-10% by weight calculated as 100% silica on 100% alkyd resin. The use of a said composition is in a further aspect disclosed.

18 Claims, No Drawings

US 9,932,492 B2

ALKYD RESIN COMPOSITION COMPRISING SILICA

CROSS REFERENCE TO RELATED APPLICATIONS

This application is a 35 U.S.C. § 371 application of International Application PCT/SE2012/000209, filed Dec. 20, 2012, which claims priority of U.S. Patent Application No. 61/581,407, filed Dec. 29, 2011, the entire disclosures of which are herein incorporated by reference.

The present invention relates to an alkyd resin composition comprising at least one autoxidatively drying alkyd resin and at least one silica comprising silica nanoparticles. Said silica particles are incorporated into the oil phase of said alkyd resin. In further aspects the present invention refers a method of obtaining said composition and to the use of said composition in coating formulations.

Alkyd and other polyester resins are well known in the art and frequently and are typically used in a large number of applications, such as putties, lacquers, enamels, gel coats, powder coatings, coil coatings, polyurethane coatings and other coating systems, printing inks, synthetic lubricants, plasticizers, fibres, dental materials, adhesives, packagings and moulding compositions.

Alkyd resins are polyesters which have been modified by the addition of for instance fatty acids or corresponding triglycerides. The term "alkyd" or "alkyd resin" was coined to define the reaction product of polyalcohols and polycarboxylic acids, in other words, polyesters. However, its definition has been narrowed to include only those polyesters comprising, in addition to polyalcohols and polycarboxylic acids, monobasic acids, usually long-chain fatty acids, or corresponding triglycerides. Oil-based alkyd resins are polyesters winch have been modified by addition of saturated or unsaturated fatty acids or corresponding triglycerides. Alkyd resins comprising monocarboxylic acids, such as benzoic acid and/or other monocarboxylic acid not typically classified as fatty acid are by some manufacturers and alkyd technicians designated as oil-free alkyd resins. For almost any given coating application, from baking enamels for appliances to flat house paints and clear wood finishes, an alkyd resin can be designed to meet the property requirements. The main reactions involved in alkyd resin synthesis are polycondensations by esterification and ester interchange/transesterification. Alkyd resins are usually referred to by a brief description based on certain classification schemes. From the classification the general properties of the resin become immediately apparent to those having basic skills in the art. Classification is based on the nature of the fatty acid/triglyceride and the oil length of the alkyd resin. Alkyd resins can broadly be classified into drying and non-drying types depending on the ability of their films to dry by air oxidation, so called autoxidative drying. Air drying ability is derived from polyunsaturated fatty acids and/or triglycerides in the resin composition. If drying oils or fatty acids, such as linseed oil, are the sources of the fatty acids for the alkyd, the resin belongs to the drying type and is usually used as the film former of coatings or inks. On the other hand, if the fatty acids come from non-drying oils, such as coconut oil, the resin is a non-drying, physically or industrially drying or a curing/baking alkyd. For an alkyd resin, the oil length is defined as the weight percent of oil or triglyceride equivalent. Some manufacturers and alkyd technicians classify alkyd resins by corresponding weight percent of fatty acids in the finished resin. Alkyd resins are typically classified into four classes by oil length: very long over 70%, long 56-70%, medium 46-55% and short below 45%.

The application areas and production methods of alkyd resins are well known in the art and do not require any further and over extensively detailed description. Said product is thoroughly disclosed and discussed in a number of chemicals encyclopaedias and handbooks, such as Kirk-Othmer, Encyclopedia of Chemical Technology, Modern Polyesters, Chemistry and Technology of Polyesters and Copolyesters, ed. by John Scheirs and Timothy E. Long, 2003, John Wiley & Sons Ltd, and Alkyd Resin Technology, Formulating Techniques and Allied Calculations, by T. C. Patton, Interscience Publishers, 1962.

Polycarboxylic acids used in alkyd syntheses include aliphatic, cycloaliphatic or aromatic polycarboxylic acids and corresponding anhydrides, alkyl esters and halides, such as but not limited to o-phthalic acid or anhydride, isophthalic acid, terephthalic acid 1,2-cyclohexanedicarboxylic acid or anhydride, 1,3-cyclohexanedicarboxylic acid, 1,4-cyclohexanedicarboxylic acid, tetrahydrophthalic acid or anhydride, hexahydrophthalic acid or anhydride, maleic anhydride, fumaric acid, adipic acid, azelaic acid, succinic acid or anhydride, sebacic acid, furandicarboxylic acids, tetrahydrofurandicarboxylic acids, trimelletic acid or anhydride, itaconic acid, citraconic acid and/or pyromelletic acid or anhydride.

Polyalcohols used in alkyd syntheses include, but is not limited to, linear or branched aliphatic, cycloaliphatic or aromatic polyalcohols, polyester polyalcohols and polyether polyalcohols, such as but not limited to alkylene glycols, poly(alkylene) glycols, polycarbonate polyols, dihydroxyalkyl-1,3-dioxanes, di(hydroxyalkyl)furans, di(hydroxyalkyl)tetrahydrofurans, 2-alkyl-1,3-propanediols, 2,2-dialkyl-1,3-propanediols, 2-hydroxyalkyl-1,3-propanediols, 2,2-dihydroxyalkyl-1,3-propanediols, 2-alkyl-2-hydroxyalkyl-1,3-propanediols, as well as polyalkoxylated, such as a polymethoxylated, polyethoxylated and/or polypropoxylated, and dimeric, trimeric and polymeric species of said polyalcohols. Further polyalcohols include dendritic polyester and/or polyether polyalcohols. Said polyalcohols can suitably exemplified by ethylene glycol, 1,2-propanediol, 1,3-propanediol, 1,4-butylene glycol, 1,3-butylene glycol, neopentyl glycol, 2-butyl-2-ethyl-1,3-propanediol, 5,5-dihydroxymethyl-1,3-dioxane, di(hydroxymethyl)furan, di(hydroxymethyl)tetrahydrofuran, pentaerythritol spiroglycol (2,4,8,10-tetraoxaspiro[5.5]undecane-3,9-diethanol), isosorbide, isomannide, isoidide, glycerol, di-glycerol, trimethylolethane, trimethylolpropane, trimethylolbutane, di-trimethylolethane, di-trimethylolpropane, di-trimethylolbutane, pentarerythritol, di-pentaerythritol, tri-pentaerythritol, anhydroennea-heptitol, sorbitol, mannitol, glycerol mono(meth)allyl ether, di-glycerol di(meth)allyl ether, trimethylolethane mono(meth)allyl ether, trimethylolpropane mono(meth)allyl ether, trimethylolbutane mono(meth)allyl ether, pentaerythritol mono(meth)allyl ether, pentaerythritol di(meth)allyl ether, di-trimethylolethane mono(meth)allyl ether, di-trimethylolethane di(meth)allyl ether, di-trimethylolpropane mono(meth)allyl ether, di-trimethylolpropane di(meth)allyl ether, di-trimethylolbutane mono(meth)allyl ether, and/or di-trimethylolbutane di(meth)allyl ether, as well as by polyalkoxylated species of a said polyalcohol.

Monocarboxylic acids and/or triglycerides used in alkyd syntheses suitably and preferably include abietic acid, benzoic acid, p-tert.-butylbenzoic acid, caproic acid, capric acid, castor fatty acid or castor oil, coconut fatty acid or coconut oil, cottonseed fatty acid or cottonseed oil, acrylic acid, methacrylic acid, crotonic acid, iso-crotonic acid, 2-ethylhexanoic acid, 2-propylheptanoic acid, lauric acid, linoleic acid, oleic acid, pelargonic acid, soybean fatty acid or soybean oil, tall oil fatty acid, safflower fatty acid or safflower oil, linseed fatty acid or linseed oil, sunflower fatty acid or sunflower oil, linolenic acid, eleostearic acid, tung oil, poppy seed oil, perilla oil, oiticia oil, fish oil, dehydrated castor oil or fatty acid, almond oil, bassau oil, cocoa butter oil, macadamia oil, olive oil, peanut oil and/or nahar seed oil.

Further suitable raw materials used in alkyd syntheses include hydroxyfunctional carboxylic acids, such as but not limited to, dimethylolpropionic acid, dimethylolbutyric acid, trihydroxymethyl acetic acid, dihydroxymethylvaleric acid, dihydroxypropionic acid, heptonic acid, citric acid, tartaric acid, dihydroxymalonic acid, gluconic acid, dihydroxybenzoic acid, hydroxyvaleric acid, hydroxypropionic acid and/or hydroxypivalic acid and/or lactones and other inner ether, such as glycolide, valerolactone, propiolactone, caprolactone and/or polycaprolactone.

Alkyd resins can furthermore comprise linear or branched aliphatic, cycloaliphatic or aromatic monofunctional alcohols, such as alkanols having for instance 1-18 carbon atoms, 5-alkyl-5-hydroxyalkyl-1,3-dioxanes and/or monohydroxy functional (meth)allyl ethers. These compounds can suitably be exemplified by, but are not limited to, 2-ethylhexanol, 2-propylheptanol, isononanol, isodecanol, 5-methyl-5-hydroxymethyl-1,3-dioxane, 5-ethyl-5-hydroxymethyl-1,3-dioxane, glycerol di(meth)allyl ether, trimethylolethane di(meth)allyl ether, trimethylolpropane di(meth)allyl ether, trimethylolbutane di(meth)allyl ether and pentaerythritol tri(meth)allyl ether.

Certain embodiments of alkyd resins can furthermore comprise isocyanate components comprising isocyanates and polyisocyanates such as, but not limited to, methyl isocyanate, toluene diisocyanate, diphenyl methane diisocyanate, hexamethylene diisocyanate, isophorone diisocyanate, tetramethylxylene diisocyanate, dicyclohexyl methane diisocyanate, furan diisocyanate, tetrahydrofuran diisocyanate, cyclohexylene diisocyanate, xylene diisocyanate, naphthalene diisocyanate, phenylene diisocyanate, nonane triisocyanate and/or triphenyl methane triisocyanate. Further suitable isocyanate based components include isocyanurates, biurets and allophanates.

Yet further possible raw materials used in alkyd syntheses include epoxy functional compounds, such as, but not limited to, 1,2-epoxy-3-allyloxypropane, 1-allyloxy-2,3-epoxypropane, 1,2-epoxy-3-phenoxypropane, 1-glycidyloxy-2-ethylhexane, bisphenol A-diglycidyl ether or a reaction product thereof, diglycidyl ether of pentaerythritol spiroglycol (glycidyl ether of 2,4,8,10-tetraoxaspiro[5.5]undecane-3,9-diethanol), diglycidyl terephthalate, epoxidised soybean fatty acid, epoxidised soybean oil, epoxidised polyvinyl alcohol, epoxidised dehydrated castor oil, epoxidised linseed oil and 3,4-epoxycyclohexylmethyl-3,4-epoxycyclohexane-carboxylate.

Alkyd resins can furthermore be modified by compounds such as thiols, polythiols, thio acids, polythio acids, amines, polyamines, vinylics, such as styrene and vinyltoluene, silicones, oxetanes and/or hydroxyoxetanes, such as oxetanes of 2-alkyl-1,3-propanediols, 2,2-dialkyl-1,3-propanediols, 2-alkyl-2-hydroxyalkyl-1,3-propanediols, 2,2-dihydroxyalkyl-1,3-propanediols as well as dimers and polymers thereof.

Autoxidatively drying alkyd based compositions typically comprises one or more metallic driers, also known as siccatives, being metallic carboxylates, soaps, and resinates of for instance alkaline earth metals, rare earth metals or transition metals and monobasic carboxylic acids, such as 2-ethylhexanoic acid (octanoic acid), naphthenic acid, neodecanoic acid, stearic acid or other preferably lipophilic carboxylic acid. Typically used driers include primary driers, such as carboxylates and resinates of for instance cobalt, manganese, vanadium, iron and cerium and secondary driers, such as carboxylates and resinates of for instance lead, zirconium, aluminium, bismuth, strontium and barium. Further known in the art metallic driers include carboxylates and resinates of for instance calcium, zinc, lithium, lanthanium, neodynium, copper, titanium, nickel, tin and potassium.

Increasing environmental and health concerns have opted for autoxidatively drying alkyd based coating compositions, wherein the content of metal driers are substantially reduced or, as in the case of cobalt based driers, entirely omitted. Cobalt is by far the most active of the primary driers and is despite environmental and health drawbacks still the most important and widely used drier in autoxidatively drying coatings, solventborne as well as waterborne. It has now quite unexpectedly been found that incorporation of silica nanoparticles into the alkyd resin can produce a coating composition wherein the content of hazardous metals, in particular cobalt, remaining in formed coating film is substantially reduced or even completely omitted.

Incorporation of nanoparticles into coatings have been known for more than 10 years. The main focus has been to enhance the scratch resistance of ultraviolet (UV) curing coatings and waterborne coatings, such as two component polyurethane resins (2K PUR) clear coats to automotive and polyurethane dispersions (PUD) for flooring. Later nanoparticles have also been used to improve weather resistance and to reduce dirt pickup. Typically used nanoparticles include among others silica, titanium dioxide and cerium oxide. The properties of a material may change dramatically when it is in the form of very small particles of nano size. One parameter that increases is the surface area. Colloidal silica have for example a surface area in the range of 30-1000 $m^2/g$.

State of the art of using silica nanoparticles in alkyd resins is today to add a silica sol to a waterborne alkyd. This will give silica particles in the water phase and between the coalesced oil droplets. Upon drying/curing the silica particles will be located at the interface, that is between the surface exposed to air and the substrate. The silica particles will hence be unevenly distributed in the dried film. It has therefore been desirable to find a way to prepare improved compositions comprising alkyd resin and silica particles.

It is accordingly one of the objects of the present invention to overcome or ameliorate at least one of the disadvantages of the prior art. An alkyd resin based coating composition and a process for obtaining a said composition has now been developed making it possible to transfer silica particles, such as silica nanoparticles, from having water as the outer phase to having alkyd as the outer phase. An alkyd resin, as substantially 100% or only comprising possible residual azeotropic solvent used and/or esterification water formed in the alkyd process, is when the synthesis is completed cooled to for instance 30-140° C., such as 50-100° C., or alternatively a pre-produced alkyd resin, likewise as substantially 100%, is if not liquid at ambient temperature and/or necessary with regard to the viscosity, such as obtaining a viscosity of less than 30000-40000 mPas, heated to a temperature, such as a said temperature, liquefying the alkyd resin. Water diluted, preferably below 30% and even more preferably between 5% and 15% solid content, silica in form of an aqueous sol is admixed into the alkyd resin. Silica is advantageously admixed at a low or moderate addition rate and under vigorous stirring. A suitable addition rate can be for instance 1-5, such as 2-3, parts per minute and per 100 parts of alkyd. The amount of silica calculated as 100% silica on 100% alkyd is suitably 0.1-10%, such as 0.1-6%, 0.5-5% or 0.5-4%, by weight. The alkyd resin or the alkyd/silica composition can, furthermore, optionally be neutralised with an inorganic compound or with ammonia or an organic amine. The neutralisation can be a partial or a full neutralisation, 100%, of unreacted acid groups (acid value). Alkyd resins used in the composition according to the present invention are suitably selected among short, medium, long and very long oil oxidatively drying alkyds having for instance an acid value of 5-20 mg KOH/g and being based on raw materials as disclosed previously. Alkyd resins having lower or higher acid values can of course also be used. Suitable inorganic compounds can be exemplified by sodium hydroxide, lithium hydroxide, potassium hydroxide, sodium carbonate, potassium carbonate. Suitable amines can be triethylamine, diethanolmethylamine. A surface active agent, such as a surfactant may also be added to the alkyd resin and/or the alkyd/silica composition. The alkyd and/or the silica sol may also be slightly diluted, in an amount of for instance 1-5% by weight calculated on said alkyd or said silica sol, before, after or during said silica addition, with a solvent, for example propanol, butanol, pentanol, hexanol, octanol or the like. Subsequent the charging of said silica and any other said optional component, yielded alkyd/silica comprising composition can be stirred for some time and/or evaporated, for instance under vacuum or otherwise reduced pressure, to remove water, any residual azeotropic solvent and/or any other added volatile component. The temperature may here be raised to for instance 30-140° C., such as 50-100° C., and preferably not exceeding 150-160° C., Yielded mixture can, with or without said evaporation be diluted with an organic solvent, such as white spirit, xylene, butyl acetate, or be water emulsified, using conventional and known in the art additives and procedures, to yield an alkyd emulsion.

Silica nanoparticles are normally in the form of sols or so called colloidal particles in water, which are almost monodisperse. Colloidal silica may comprise or consist of nanoparticles, while a nanosilica not necessarily is colloidal. Preferably, the silica nanoparticles used in the present composition is an aqueous silica sot in some embodiment, the particles may have an average particle diameter ranging from about 2 to 150 nm, for example from about 3 to 60 nm, such as from about 5 to 40 nm, for example from about 5 to about 25 nm, for example from about 5 to about 12 nm.

In embodiments of the present invention said silica is a sterically or electrostatically stabilised silica and/or is salt free and/or counter ion purified. Said silica is preferably and advantageously a siloxane, silazane or preferably silane modified or treated silica and/or is modified or treated yielding a silica having at least one epoxy and/or vinyl group, in further embodiments said silica is bonded to a monomeric, oligomeric or polymeric glycidoxysilane, glycidoxyalkylsilane, glycidoxyalkylalkoxysilane, cycloalkylepoxysilane, (meth)acryloxysilane, (meth)acryloxyalkylsilane and/or (meth)acryloxyalkylalkoxysilane.

The silica nanoparticles can for instance be anionic with sodium or ammonium stabilisation or silane modified anionic with sodium stabilisation, anionic with aluminate modification at the surface with sodium stabilisation, cationic with chloride stabilisation or sterically stabilised by far instance modification with silanes, ionic and/or non-ionic surfactants, including polymeric surfactants such as block-copolymers. The silica nanoparticles may be sterically or electrostatically stabilised. Silanes used to modify the particle surface can have different functional groups, such as thiol, amine or oxirane, for instance glycidoxy silanes and cycloaliphatic epoxysilanes. In the case of oxirane, it is normally ring opened during the modification to yield two hydroxyl groups instead.

Embodiments of preferred and suitable silica compounds can be exemplified by, but not limited to, silica bonded to a monomeric, oligomeric or polymeric glycidoxysilane, glycidoxypropylsilane, tris-(trimethoxy)silane, octyltriethoxysilane, methyltriethoxysilane, methyltrimethoxysilane, tris [3-(trimethoxysilyl)propyl]isocyanuratesilane, γ-mercaptopropyltrimethoxysilane, bis-(3-[triethoxysilyl]propyl)polysulfide, β-(3,4-epoxycyclohexyl)ethyltrimethoxysilane; γ-glycidoxypropyltrimethoxysilane, γ-glycidoxypropylmethyldiethoxysilane, (3-glycidoxypropyl) hexyltrimethoxysilane, β-(3,4-epoxycyclohexyl) ethyltriethoxysilane, vinyltriethoxysilane, vinyltrimethoxysilane, vinyl-tris-(2-methoxyethoxy)silane, vinylmethyldimethoxysilane, vinyltriisopropoxysilane, γ-methacryloxypropyltrimethoxysilane, γ-methacryloxypropyltriisopropoxysilane, γ-methacryloxypropyltriethoxysilane, octyltrimethyloxysilane, ethyltrimethoxysilane, propyltriethoxysilane, phenyltrimethoxysilane, 3-mercaptopropyltriethoxysilane, cyclohexyltrimethoxysilane, cyclohexyltriethoxysilane, dimethyldimethyoxysilane, 3-chloropropyltriethoxysilane, 3-methacryloxypropyltrimethoxysilane, iso-butyltriethoxysilane, trimethylethoxysilane, phenyldimethylethoxysilane, trimethylsilylchloride, vinyltriethoxysilane, hexamethyldisiloxane and/or hexamethyldisilizane.

The alkyd resin and/or the silica sol may in embodiments of the present composition be diluted with at least one organic solvent, such as propanol, butanol, pentanol, hexanol and/or octanol, in an amount of 1-5% by weight calculated on said alkyd or said silica sol. Said solvent can be added before, after or during said silica addition.

Driers, such as Zr, Fe, K, Cu, Mn and other drier additives known and used in the art, and/or curing agents, likewise known and used in the art, as well as a substantially reduced amount of cobalt based driers, such as at most 0.01% Co calculated on 100% alkyd, can of course in embodiments of the present invention be added to the composition of the present invention comprising silica particles, incorporated as substantially herein disclosed. The presence of silica particles, in accordance with embodiments of the present invention, implies formulation of oxidatively drying coating systems being free of cobalt driers, which are on the verge of being faced out due to environmental and health issues, or only comprising substantially reduced amounts thereof. Furthermore, the composition of the present invention facilitates replacement of cobalt driers by manganese or iron driers and implies a substantial reduction of used amounts of manganese or iron based replacement driers.

The advantages of having the silica particles in the alkyd phase, as in the present invention, are an improved drying without or with considerably reduced amounts of driers, such as cobalt octoate or naphthenate and/or other driers known in the art and/or previously herein discussed, improved dirt pickup resistance, improved adhesion, improved exterior durability, improved hardness, improved abrasion over time, less brittleness, improved hiding power and improved toughness. However, having the particles distributed in the alkyd phase promote more exposed particle surfaces to the alkyd implying improved drying efficiency at a lower nanosilica content.

The present invention also encompasses a method of obtaining a composition, as disclosed above, according to the invention, said method comprises admixing said aqueous silica sol into a substantially 100% alkyd resin being in a liquid state either at ambient temperature or at an elevated temperature, said silica sol being added in an amount of 0.1-10% such as 0.1-6%, 0.5-5% or 0.5-4%, by weight calculated as 100% silica on 100% alkyd resin. Preferably, said silica is admixed under vigorous stirring. In one embodiment, after the silica addition step, said method comprises an evaporation step, which can be performed under vacuum or reduced pressure, for example, and at a temperature 40-120° C., such as 80-100° C. Before, after or during said silica addition, the alkyd and/or said silica sol, can be diluted with at least one organic solvent in an amount of 1-5% by weight calculated on said alkyd or said silica sol. As described hereinabove, non-limiting examples of suitable solvent include propanol, butanol, pentanol, hexanol and/or octanol. Said method can additionally comprise a neutralisation step wherein an inorganic base, ammonia and/or an amine is added. Said method can additionally comprise addition of at least one surfactant or emulsifier.

Alkyd emulsions, based on the composition of the present invention, which composition is obtained by the method disclosed above, can be manufactured by a variety of different methods. Depending on the properties of the alkyds, such as viscosity, acid value and hydroxyl value, some methods are preferred before others. Despite the choice of emulsion technology/process the outcome is dispersed alkyd droplets in a water phase, wherein the water is the continues media of the system. In order to achieve the alkyd droplets in the water phase and keep the system stable surfactants are typically used. For optimal results a combination of two or more different surfactants may be used, such as a combination of one ionic (small molecule that possesses high diffusion) for promoting the droplet formation and one nonionic (large polymeric surfactant) for stabilising the droplets on a long term perspective. The properties of the surfactants (HLB value) and concentration, typically 1 to 10% surfactants on the solid alkyd, of the surfactant(s) can vary depending on the properties of the alkyd. Furthermore, the alkyd may be partially or fully neutralised in order to increase the compatibility with the surfactants. By neutralisation the differences in hydrophilicity and hydrophobicity between the two material is changed (reduced) and better presumption for more effective emulsifiers are obtained. The mixing device can be for instance a dissolver, specially designed stirrer, rotor-stator homogenisator or high pressure homogenisator. A typical solid content of an alkyd emulsion is from 30-60%.

It is, of course, also possible to prepare solvent borne coatings by diluting the present composition with an organic solvent.

In a further aspect, the present invention refers to the use of an alkyd resin composition as herein disclosed in production of materials and articles, such as decorative and/or protective solvent borne or waterborne varnishes, paints and enamels. Alkyds comprising, in accordance with the present invention, silica particles can be used for clear lacquers and for paints and enamels comprising pigments, fillers and any other type of additives commonly used and known in the art.

Without further elaboration, it is believed that one skilled in the art can, using the preceding description, utilise the present invention to its fullest extent. The following preferred specific embodiments are, therefore, to be construed as merely illustrative and not limitative in any way whatsoever. Example 1 refer to utilised alkyd resins. Examples 2-12 to embodiments of the composition according to the present invention and Examples 13 and 14 are comparative examples without silica nanoparticles.

In the Examples, drying times were assessed using a Beck-Koller Drying Recorder (Sheen Instruments Ltd). The test composition was applied on a glass plate using a draw bar yielding a wet coating having a filmthickness of 75±5 µm. Drying was recorded according to ASTM D 5895. The amount of Co drier in embodiment Examples 5-8 are six (6) times lower than in comparative Example 14, which Example comprises an, in air drying alkyd resins, typically used amount of Co. Examples 5-8 thus evidences that a substantially reduced amount of Co with kept drying properties can be used in accordance with the present invention.

EXAMPLE 1

In the following Examples 1-14, two (2) different oxidatively drying alkyd resins were used and alkyd emulsions were, using conventional methods as previously disclosed, prepared by emulsifying 40 parts by weight of a composition yielded in Example 2-14, with an addition of 2% by weight of an anionic surfactant and 8% by weight of a non-ionic surfactant (said percentages being weight percentages calculated on 100% alkyd), in 60 parts by weight of water. All yielded emulsions were clear and stable.

Used alkyd resins exhibited following properties:

|  | Alkyd Resin 1 | Alkyd Resin 2 |
| --- | --- | --- |
| Oil length, % | 72 | 65 |
| Acid value, mg KOH/g | 9 | 8 |
| Hydroxyl value, mg KOH/g | 50 | 43 |
| Molecular weight, Mw, g/mol | 55 000 | 85 000 |

EXAMPLE 2

100 parts by weight of alkyd resin 1 was heated to 80° C. and 2.29 parts by weight of a 25% solution of NaOH were under stirring (210 rpm) added. The mixture was subsequently for 1 hour vigorously stirred (ca. 260 rpm). 6.67 parts by weight of an aqueous silica sol (Bindzil® PC300, Eka Nobel, Sweden) was now added and the resulting mixture was for 1 hour vigorously stirred (ea. 260 rpm) at 80° C. Yielded composition was finally submitted to vacuum at 80° C. during 2 hours to remove water and/or residual azeotropic solvent. Drying properties, at 40% non-volatile content, was recorded on a Beck-Koller Drying Recorder at a wet filmthickness of 75±5 µm. The result is given in Table 1.

EXAMPLE 3

100 parts by weight of alkyd resin 1 was heated to 80° C. 6.67 parts by weight of an aqueous silica sol (Bindzil® PC300, Eka Nobel, Sweden) and 2 parts of butanol were added under vigorous stirring (ca. 260 rpm). Yielded composition was for 1 hour vigorously stirred (ca. 260 rpm) at 80° C. and yielded composition was finally submitted to vacuum at 80° C. during 2 hours to remove water. Drying properties, at 40% non-volatile content, was recorded on a

EXAMPLE 4

100 parts by weight of alkyd resin 1 heated to 80° C. and 2.29 parts by weight of a 25% solution of NaOH were under stirring (210 rpm) added. The mixture was subsequently vigorously stirred (ca. 260 rpm) for 1 hour. 6.67 parts by weight of a silica sol (Ludox® SM-30, Grace Davidson, USA) was then added and resulting mixture was for 1 hour vigorously (ca. 260 rpm) stirred at 80° C. Yielded composition was finally submitted to vacuum at 80° C. during 2 hours to remove water. Drying properties, at 40% non-volatile content, was recorded on a Beck-Koller Drying Recorder at a wet filmthickness of 75±5 μm. The result is given in Table 1.

EXAMPLE 5

100 parts by weight of alkyd resin 1 was heated to 80° C. and 2.29 parts by weight of a 25% solution of NaOH were under stirring added. The mixture was subsequently for 1 hour vigorously stirred (ca. 260 rpm). 6.67 parts by weight of a silica sol (Bindzil® PC300, Eka Nobel, Sweden) was now added and the mixture was for a further hour vigorously stirred (ca. 260 rpm) followed by addition of 0.167 parts by weight of a solution of cobalt/zirconium drier (6% Co and 9% Zr) and the resulting mixture was for yet 1 hour vigorously stirred (ca. 260 rpm). Yielded composition was finally submitted to vacuum at 80° C. during 2 hours to remove water. Drying properties, at 40% non-volatile content, was recorded on a Beck-Koller Drying Recorder at a wet filmthickness of 75±5 μm. The result is given in Table 1.

EXAMPLE 6

100 parts by weight of alkyd resin 2 was heated to 80° C. and 2.29 parts by weight of a 25% solution of NaOH were under stirring added. The mixture was subsequently for 1 hour vigorously stirred (ca. 260 rpm). 6.67 parts by weight of a silica sol (Bindzil® PC300, Eka Nobel, Sweden) was now added and the mixture was for a further hour vigorously stirred (ca. 260 rpm) followed by addition of 0.167 parts by weight of a solution of cobalt/zirconium drier (6% Co and 9% Zr) and the resulting mixture was for yet 1 hour vigorously stirred (ca. 260 rpm). Yielded composition was finally submitted to vacuum at 80° C. during 2 hours to remove water. Drying properties, at 40% non-volatile content, was recorded on a Beck-Koller Drying Recorder at a wet filmthickness of 75±5 μm. The result is given in Table 1.

EXAMPLE 7

100 parts by weight of alkyd resin 1 was heated to 80° C. and 2.29 parts by weight of a 25% solution of NaOH were under stirring added. The mixture was subsequently for 1 hour vigorously stirred (ca. 260 rpm). 3.34 parts by weight of a silica sol (Bindzil® PC300, Eka Nobel, Sweden) was now added and the mixture was for a further hour vigorously stirred (ca. 260 rpm) followed by addition of 0.167 parts by weight of a solution of cobalt/zirconium drier (6% Co and 9% Zr) and the resulting mixture was for yet 1 hour vigorously stirred (ca. 260 rpm). Yielded composition was finally submitted to vacuum at 80° C. during 2 hours to remove water. Drying properties, at 40% non-volatile content, was recorded on a Beck-Koller Drying Recorder at a wet filmthickness of 75±5 μm. The result is given in Table 1.

EXAMPLE 8

100 parts by weight of alkyd resin 1 was heated to 80° C. and 2.29 parts by weight of a 25% solution of NaOH were under stirring added. The mixture was subsequently for 1 hour vigorously stirred (ca. 260 rpm). 13.36 parts by weight of a silica sol (Bindzil® PC300, Eka Nobel, Sweden) was now added and the mixture was for a further hour vigorously stirred (ca. 260 rpm) followed by addition of 0.167 parts by weight of a solution of cobalt/zirconium drier (6% Co and 9% Zr) and the resulting mixture was for yet 1 hour vigorously stirred (ca. 260 rpm). Yielded composition was finally submitted to vacuum at 80° C. during 2 hours to remove water. Drying properties, at 40% non-volatile content, was recorded on a Beck-Koller Drying Recorder at a wet filmthickness of 75±5 μm. The result is given in Table 1.

EXAMPLE 9

100 parts by weight of alkyd resin 1 heated to 80° C. and 2.29 parts by weight of a 25% solution of NaOH were under stirring (210 rpm) added. The mixture was subsequently vigorously stirred (ca. 260 rpm) for 1 hour. 5.38 parts by weight of a silica sol (Ludox® TMA, Grace Davidson, USA) was then added and resulting mixture was for 1 hour vigorously (ca. 260 rpm) stirred at 80° C. Yielded composition was finally submitted to vacuum at 80° C. during 2 hours to remove water. Drying properties, at 40% non-volatile content, was recorded on a Beck-Koller Drying Recorder at a wet filmthickness of 75±5 μm. The result is given in Table 1.

EXAMPLE 10

100 parts by weight of alkyd resin 1 was heated to 80° C. and 2.29 parts by weight of a 25% solution of NaOH were under stirring (210 rpm) added. The mixture was for 1 hour vigorously stirred (ca. 260 rpm). 6.67 parts by weight of a silica sol (Bindzil® PC300, Eka Nobel, Sweden) and 2 parts of butanol were subsequently added under vigorous stirring. The mixture was yet 1 hour vigorously stirred (ca. 260 rpm). Yielded composition was finally submitted to vacuum at 80° C. during 2 hours to remove water. Drying properties, at 40% non-volatile content, was recorded on a Beck-Koller Drying Recorder at a wet filmthickness of 75±5 μm. The result is given in Table 1.

EXAMPLE 11

100 parts by weight of alkyd resin 1 was heated to 80° C. and 2.29 parts by weight of a 25% solution of NaOH were under stirring (210 rpm) added. The mixture was for 1 hour vigorously stirred (ca. 260 rpm). 6.67 parts by weight of a silica sol (Bindzil® PC300, Eka Nobel, Sweden) and 2 parts of hexanol were subsequently added under vigorous stirring. The mixture was yet 1 hour vigorously stirred (ca. 260 rpm). Yielded composition was finally submitted to vacuum at 80° C. during 2 hours to remove water. Drying properties, at 40% non-volatile content, was recorded on a Beck-Koller Drying Recorder at a wet filmthickness of 75±5 μm. The result is given in Table 1.

EXAMPLE 12

100 parts by weight of alkyd resin 1 was heated to 80° C. and 2.29 parts by weight of a 25% solution of NaOH were under stirring (210 rpm) added. The mixture was for 1 hour vigorously stirred (ca. 260 rpm). 6.67 parts by weight of a silica sol (Bindzil® PC300, Eka Nobel, Sweden) and 2 parts of pentanol were subsequently added under vigorous stirring. The mixture was yet 1 hour vigorously stirred (ca. 260 rpm). Yielded composition was finally submitted to vacuum at 80° C. during 2 hours to remove water. Drying properties, at 40% non-volatile content, was recorded on a Beck-Koller Drying Recorder at a wet filmthickness of 75±5 µm. The result is given in Table 1.

EXAMPLE 13 (COMPARATIVE)

100 parts by weight of alkyd resin 1 was heated to 80° C. and 2.29 parts by weight of a 25% NaOH solution was under stirring (210 rpm) added. This mixture was for 1 hour vigorously stirred (ca. 260 rpm) at 80° C. Yielded composition was finally submitted to vacuum during 2 hours to remove water. Drying properties, at 40% non-volatile content, was recorded on a Beck-Koller Drying Recorder at a wet filmthickness of 75±5 µm. The result is given in Table 1.

EXAMPLE 14 (COMPARATIVE)

100 parts by weight of alkyd resin 1 was heated to 80° C. and 2.29 parts by weight of a 25% solution of NaOH were under stirring (210 rpm) added. The mixture was for 1 hour vigorously stirred (ca. 260 rpm) and 1 part by weight of a solution of cobalt/zirconium drier (6% Co and 9% Zr) was subsequently added. Resulting mixture was for yet 1 hour vigorously stirred (ca. 260 rpm) at 80° C. Yielded composition was finally submitted to vacuum at 80° C. during 2 hours to remove water. Drying properties, at 40% non-volatile content, was recorded on a Beck-Koller Drying Recorder at a wet filmthickness of 75±5 µm. The result is given in Table 1.

TABLE 1

|  | Dust Free hrs. | Tack Free hrs. | Through Dry hrs. | Hard hrs. |
|---|---|---|---|---|
| Example 2 | 2 | 14 | 32 | 41 |
| Example 3 | 8 | 27 | 48 | 48 |
| Example 4 | 1 | 2.5 | 32.5 | 40 |
| Example 5 | 0.5 | 1.5 | 2.5 | 4 |
| Example 6 | 2 | 3 | 6 | 11 |
| Example 7 | 0.5 | 1.5 | 2.5 | 4.5 |
| Example 8 | 0.5 | 1 | 3 | 5.5 |
| Example 9 | 8.5 | 13.5 | 28.5 | 42 |
| Example 10 | 1 | 5 | 28 | 41 |
| Example 11 | 5.5 | 11.5 | 18 | 40.5 |
| Example 12 | 1.5 | 13 | 22.5 | 41 |
| Example 13 (comparative) | 10 | 19 | 45 | 47.5 |
| Example 14 (comparative) | 0.5 | 1 | 2.5 | 6.5 |

The invention claimed is:

1. An oxidatively drying alkyd resin composition comprising:
   a. oxidatively drying alkyd resin; and
   b. colloidal silica within the oxidatively drying alkyd resin, wherein the oxidatively drying alkyd resin forms the outer phase of the colloidal silica, and the amount of colloidal silica is 0.5 to 5% by weight calculated as 100% silica on 100% alkyd resin; wherein the colloidal silica has a particle size of 5 nm to 200 nm.

2. A composition according to claim 1, wherein the oxidatively drying alkyd resin is essentially 100% alkyd resin.

3. A composition according to claim 2, wherein the essentially 100% alkyd resin is partially or fully neutralized.

4. A composition according to claim 1, wherein said composition additionally comprises a pigment and/or filler.

5. A composition according to claim 1, wherein said alkyd resin is at least partially neutralized with an inorganic base, ammonia, or an amine.

6. A composition according to claim 1, wherein said composition additionally comprises at least one surfactant or emulsifier.

7. A composition according to claim 1, wherein the colloidal silica is silane modified or treated.

8. A composition according to claim 1, wherein the oil length, a measure of the fatty acid/oil content, of the oxidatively drying alkyd resin is between 10% and 90%.

9. A composition according to claim 1, wherein the oil length, a measure of the fatty acid/oil content, of the oxidatively drying alkyd resin is between 20% and 90%.

10. A composition according to claim 1, further comprising a dryer additive and/or a curing agent.

11. A composition according to claim 10 comprising a dryer additive selected from the group consisting of Zr, Fe, K, Cu, and Mn.

12. A composition according to claim 1 that is free of cobalt.

13. A composition according to claim 1 comprising a nonionic and/or an anionic emulsifier, wherein the amount of nonionic and/or anionic emulsifier is 2% to 10% by weight, calculated as 100% emulsifier on 100% alkyd resin.

14. A composition of claim 13 comprising both a nonionic and an anionic emulsifier.

15. A composition of claim 1, wherein the oxidatively drying alkyd resin comprises a tall oil-based alkyd.

16. A composition of claim 1 prepared by a process comprising:
   (i) mixing an aqueous silica sol comprising colloidal silica into essentially 100% oxidatively drying alkyd resin; and
   (ii) removing water from the mixture of (i).

17. A composition of claim 16 further comprising neutralizing the essentially 100% oxidatively drying alkyd resin using an inorganic base, ammonia, and/or an amine.

18. An oxidatively drying alkyd resin composition consisting essentially of:
   a. oxidatively drying alkyd resin having a very long (over 70%) and/or long (56-70%) oil length;
   b. colloidal silica having a particle size of 5 nm to 200 nm within the oxidatively drying alkyd resin, wherein the oxidatively drying alkyd resin forms the outer phase of the colloidal silica, and the amount of colloidal silica is 0.5 to 5% by weight calculated as 100% silica on 100% alkyd resin;
   c. optionally, a pigment, filler, dryer additive, and/or curing agent; and
   d. optionally, a nonionic and/or anionic emulsifier.

* * * * *